US012744561B2

(12) United States Patent
Fazli Yeknami et al.

(10) Patent No.: US 12,744,561 B2
(45) Date of Patent: Sep. 22, 2026

(54) DUAL CML ECHO CANCELLER WITH SINGLE-ENDED TO DIFFERENTIAL CONVERSION

(71) Applicant: Samsung Electronics Co., Ltd., Suwon-si (KR)

(72) Inventors: Ali Fazli Yeknami, San Jose, CA (US); Haritha Eachempatti, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 248 days.

(21) Appl. No.: 18/780,281

(22) Filed: Jul. 22, 2024

(65) Prior Publication Data

US 2025/0357967 A1 Nov. 20, 2025

Related U.S. Application Data

(60) Provisional application No. 63/647,980, filed on May 15, 2024.

(51) Int. Cl.
*H04B 3/32* (2006.01)

(52) U.S. Cl.
CPC .................................... *H04B 3/32* (2013.01)

(58) Field of Classification Search
CPC .................................. H04B 3/32; H04B 3/23
See application file for complete search history.

(56) References Cited

U.S. PATENT DOCUMENTS 6,972,597 B2 12/2005 Kim
7,702,004 B2 4/2010 Deas et al.
7,813,495 B1 * 10/2010 Ziazadeh .............. H04B 3/235 379/398
7,970,122 B2 * 6/2011 Chen .................... H04M 9/082 379/406.01
8,254,506 B2 8/2012 Chan
8,731,183 B1 * 5/2014 Goodson ................. H04B 3/23 379/406.01
9,673,959 B2 6/2017 Zhou et al.
9,858,944 B1 * 1/2018 Malik ................ G10L 21/0208
10,778,404 B1 9/2020 Farjadrad
11,507,529 B2 11/2022 Farjadrad
2009/0168672 A1 * 7/2009 Shoor ..................... H04B 3/23 370/286
2010/0208908 A1 * 8/2010 Hoshuyama .......... H04M 9/082 379/406.06
2015/0371656 A1 * 12/2015 Gao ................... G10L 21/0208 381/66
2016/0277588 A1 * 9/2016 Jang ..................... H04M 9/082
2021/0006277 A1 * 1/2021 Gupta .................... H04B 1/123

(Continued)

*Primary Examiner* — Syed Ali

(74) *Attorney, Agent, or Firm* — Womble Bond Dickinson (US) LLP

(57) ABSTRACT

A system may include a signal replica transmitter configured to generate a replica signal based on a first signal, and an echo canceller configured to remove crosstalk from a second signal. The echo canceller may include a first current mode logic (CML) circuit configured to receive a first set of input signals, and a second CML circuit configured to receive a second set of input signals, wherein a first output from the first CML circuit and a second output from the second CML circuit may be combined to remove the crosstalk from the second signal and generate an output signal from the echo canceller.

16 Claims, 9 Drawing Sheets

(56) References Cited

U.S. PATENT DOCUMENTS

2023/0050128 A1* 2/2023 Razavi Majomard ....................... H04L 25/03006
2023/0246661 A1 8/2023 Chen et al.
2023/0291433 A1* 9/2023 Benjamin .............. H04B 1/525

* cited by examiner

FIG. 3

Sensor 300

FETX 302

RX 303

304

Source 301

NETX 306

VDD
I1
I2
M1
M2
M3
M4
gm
gm
gm
gm
VREP−
VREP+
VLINE+
VLINE−
Vom
Vop
RL
RL1
RL
RL2

DUAL CML ECHO CANCELLER WITH SINGLE-ENDED TO DIFFERENTIAL CONVERSION

CROSS-REFERENCE TO RELATED APPLICATION(S)

This application claims the priority benefit under 35 U.S.C. § 119 (e) of U.S. Provisional Application No. 63/647,980, filed on May 15, 2024, the disclosure of which is incorporated by reference in its entirety as if fully set forth herein.

FIELD

The present disclosure generally relates to signal transmissions. More particularly, the subject disclosed herein relates to a common mode logic echo canceller with single-ended to differential conversion.

SUMMARY

Some electronic devices and systems (e.g., in-car cameras, displays, and their related electronic control units (ECU)) require high-speed data transmission between them. Such systems may use a bi-directional (e.g., full duplex) but asymmetric transmissions, whereby the link from the source (e.g., sensor or camera) to the sink (e.g., the ECU) is high speed, up to about 16 Gbps but the link from the sink to the source is low speed, up to about 100 Mbps. Therefore, the source transmits high speed data but receives low speed data. Because transmission and reception happen at the same time, there is a direct echo from the source's transmitter back into source's receiver. To remove such undesired echo (e.g., undesired signals), an echo canceller may be implemented at the source to remove such undesired signals. However, some echo removal techniques result in signal attenuation and/or loss of linearity, both having detrimental effects on the desired signal. To overcome these issues, systems and methods are described herein to remove the undesired signal without suffering from attenuation while maintaining linearity of the signal.

According to a first embodiment a system may include: a signal replica transmitter configured to generate a replica signal based on a first signal; and an echo canceller configured to remove crosstalk from a second signal, the echo canceller including: a first current mode logic (CML) circuit configured to receive a first set of input signals; and a second CML circuit configured to receive a second set of input signals, wherein a first output from the first CML circuit and a second output from the second CML circuit are combined to remove the crosstalk from the second signal and generate an output signal from the echo canceller.

The first signal may be generated by a near-end transmitter (NETX) of a first electronic device, and the second signal may include a third signal generated by a far-end transmitter (FETX) of a second electronic device and the crosstalk from the first electronic device.

The third signal may be transmitted by the second electronic device by a single-ended interface, and the third signal may be received by the first electronic device by a differential interface.

The first set of input signals may include the replica signal, the first CML circuit may include a first transistor and a second transistor, the replica signal is applied to a gate of the first transistor, and the replica signal is applied to a gate of the second transistor. The second set of input signals may include the second signal, the second CML circuit includes a third transistor and a fourth transistor, the second signal is applied to a gate of the third transistor, and the second signal is applied to a gate of the fourth transistor.

The first transistor and the third transistor may be coupled to a first variable load resistor, and the second transistor and the fourth transistor are coupled to a second variable load resistor.

The first transistor and the second transistor may be coupled to a first current source, and the third transistor and the fourth transistor are coupled to a second current source.

The first set of input signals may include the replica signal and the second signal, the first CML circuit includes a first transistor and a second transistor, the second signal is applied to a gate of the first transistor, and the replica signal is applied to a gate of the second transistor.

The second set of input signals may include the replica signal and the second signal, the second CML circuit includes a third transistors and a fourth transistors, the replica signal is applied to a gate of the third transistors, and the second signal is applied to a gate of the fourth transistor.

The first transistor and the third transistor may be coupled to a first variable load resistor, and wherein the second transistor and the fourth transistor are coupled to a second variable load resistor.

The first transistor may be coupled to a first current source, the second transistor is coupled to a second current source, the third transistor is coupled to a third current, and the fourth transistor is coupled to a fourth current source.

According to a second embodiment, a method may include: generating, by a replica transmitter, a replica signal based on a first signal; and removing, by an echo canceller, crosstalk from a second signal, the echo canceller including: a first current mode logic (CML) circuit configured to receive a first set of input signal signals; and a second CML circuit configured to receive a second set of inputs signals, wherein a first output from the first CML circuit and a second output from the second CML circuit are combined to remove the crosstalk from the second signal and generate an output signal from the echo canceller.

The first signal may be generated by a near-end transmitter (NETX), and the second signal includes a third signal generated by a far-end transmitter (FETX) and the crosstalk.

The first set of input signals may include the replica signal, the first CML circuit includes a first transistor and a second transistor, the replica signal is applied to a gate of the first transistor, and the replica signal is applied to a gate of the second transistor.

The second set of input signals may include the second signal, the second CML circuit includes a third transistor and a fourth transistor, the second signal is applied to a gate of the third transistor, and the second signal is applied to a gate of the fourth transistor.

The first transistor and the third transistor may be coupled to a first variable load resistor.

The second transistor and the fourth transistor may be coupled to a second variable load resistor.

The first transistor and the second transistor may be coupled to a first current source, and the third transistor and the fourth transistor are coupled to a second current source.

The first set of input signals may include the replica signal and the second signal, the first CML circuit includes a first transistor and a second transistor, the second signal is applied to a gate of the first transistor, and the replica signal is applied to a gate of the second transistor.

The second set of input signals may include the replica signal and the second signal, the second CML circuit includes a third transistors and a fourth transistors, the replica signal is applied to a gate of the third transistors, and the second signal is applied to a gate of the fourth transistor.

BRIEF DESCRIPTION OF THE DRAWINGS

In the following section, the aspects of the subject matter disclosed herein will be described with reference to exemplary embodiments illustrated in the figures, in which:

FIG. 3 is a block diagram of an example bidirectional system or electronic device that includes a first electronic device coupled with a second electronic device over an interface, according to one or more embodiments of the present disclosure.

FIG. 6 is a schematic view of an active echo canceller circuit, according to one or more embodiments of the present disclosure.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components, and circuits have not been described in detail to not obscure the subject matter disclosed herein.

Figure 1:
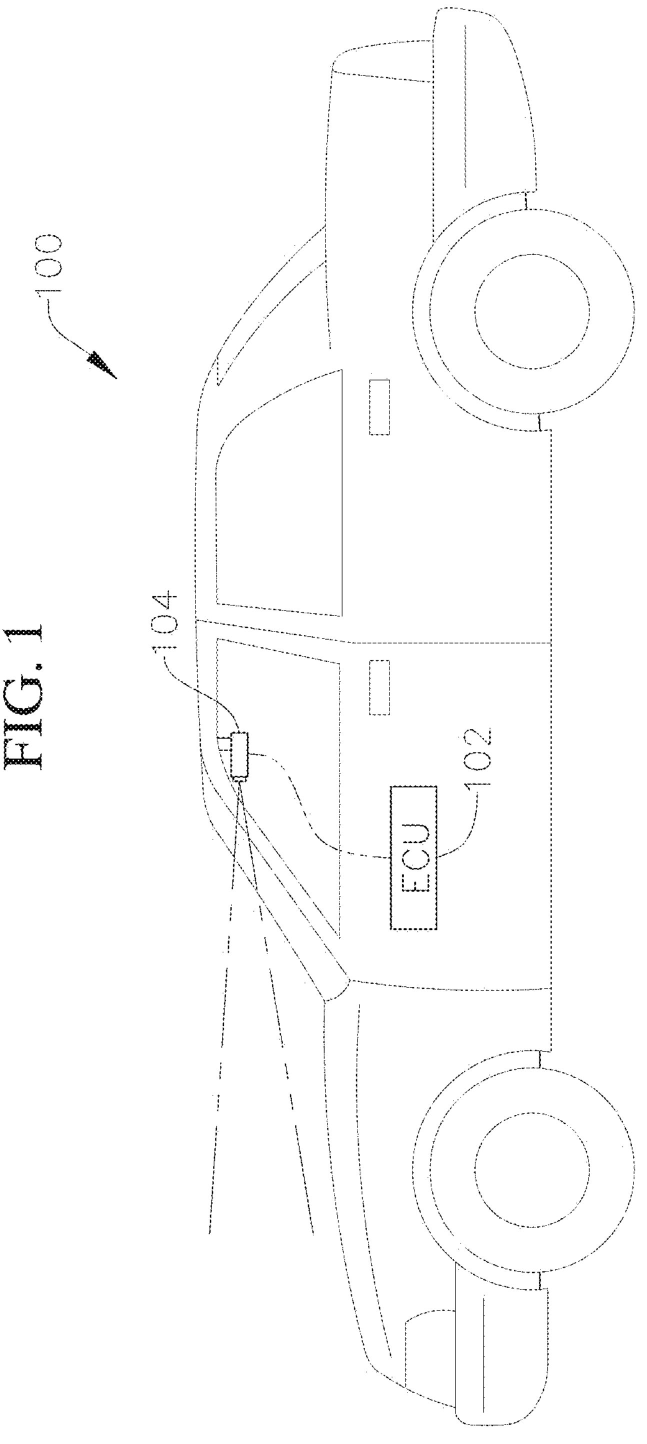
FIG. 1 is an illustration of example application of a system and/or electronic device, according to one or more embodiments of the present disclosure.

Various electronic devices and systems utilize high-speed interfaces to communicate or transfer data between the devices or between chips within the devices. Examples of some of these devices may include displays, electronic control units (ECUs), cameras, memories, semiconductor on chip (SOC), and the like. Some of these devices may be configured to operate in a full duplex mode or manner such that data or signal may be transmitted and received by the devices at the same time. FIG. 1 illustrates one such example of an electronic device (or system) that is implemented in an automobile 100 where an ECU 102 (which may include a display device) in the car is connected by a high-speed interface (e.g., a high-speed serial interface) to an onboard sensor such as a camera 104, e.g., such as those that monitor road conditions or a backup camera that assists the driver when driving in reverse. In some instances, it is desirable for the ECU 102 to communicate with the camera 104 in full duplex mode of operation. For example, the ECU 102 may be part of an electronic device that may receive image or video data from the camera 104 while at the same time, the ECU 102 may transmit information to the camera 104 (e.g., instructions to the camera). Accordingly, the ECU 102 and the camera 104 may be said to operate in full duplex mode.

Figure 2:
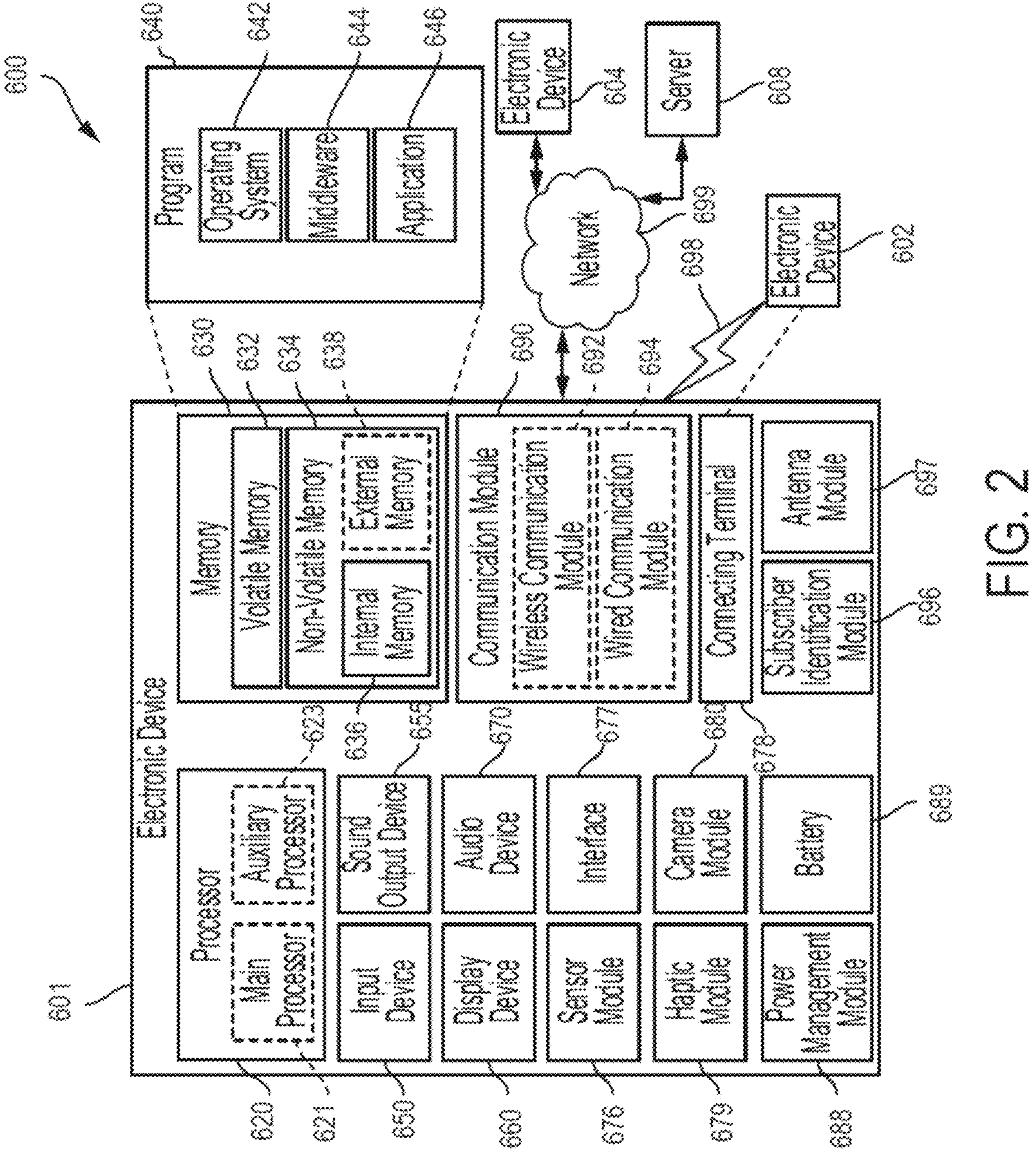
FIG. 2 is a block diagram of an electronic device including at least an ECU and a camera module, according to one or more embodiments of the present disclosure.

FIG. 2 is a block diagram of an electronic device including at least the ECU 102 and the camera 104 as described with reference to FIG. 1, in an automobile or other vehicles in a network environment 600, according to one or more embodiments.

Referring to FIG. 2, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) card 696, or an antenna module 697. In one embodiment, at least one (e.g., the display device 660 or the camera module 680) of the components may be omitted from the electronic device 601, or one or more other components may be added to the electronic device 601. Some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute software (e.g., a program 640) to control at least one other component (e.g., a hardware or a software component) of the electronic device 601 coupled with the processor 620 and may perform various data processing or computations.

As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). The auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634. Non-volatile memory 634 may include internal memory 636 and/or external memory 638.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. The display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. The audio module 670 may obtain the sound via the input device 650 or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. The interface 677 may include, for example, a high-definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. The connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. The haptic module 679 may include, for example, a motor, a piezoelectric element, or an electrical stimulator.

The camera module 680 may capture a still image or moving images. The camera module 680 may include one or more lenses, image sensors, image signal processors, or flashes. The power management module 688 may manage power supplied to the electronic device 601. The power management module 688 may be implemented as at least part of, for example, a power management integrated circuit (PMIC).

The battery 689 may supply power to at least one component of the electronic device 601. The battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. The communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as BLUETOOTH™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. The antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

Commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

In one or more embodiments, the electronic device 601 may be implemented in, for example, an automobile 100 such as that described with reference to FIG. 1, and the one or more of the devices and/or modules of the electronic device 601 may be connected to each other with a high-speed interface such as a high-speed serial interface.

Figure 3:
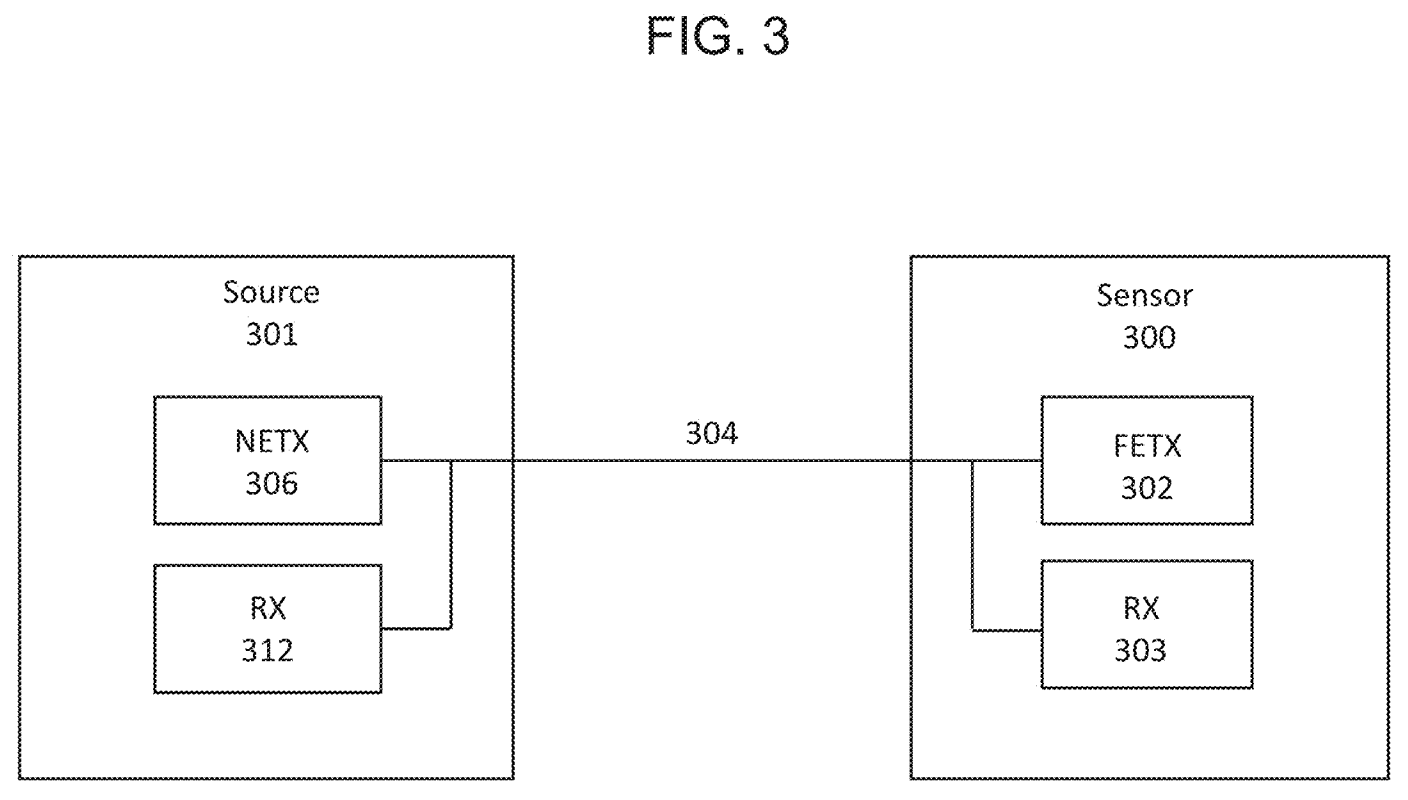

FIG. 3 is an example block diagram of a bidirectional system that includes a second electronic device 300 coupled with a first electronic device 301 over an interface 304. In some embodiments, the second electronic device 300 may be a sink, such as the ECU and the first electronic device 301 may be a sensor, such as the camera 104 and the ECU 102 described with reference to FIG. 1. It should be noted that a camera and an ECU are provided here as example implementations of some electronic devices and to help the reader better understand the various embodiments of the present disclosure but are not limited thereto. A person having ordinary skill in the art may appreciate that the camera and the display may be replaced by any one or more type of electronic devices and/or systems that may communicate with each other over an interface, including memory devices and SOCs.

The second electronic device 300 may include a far-end transmitter (FETX) 302 that is configured to transmit data or signal via the interface 304 to the first electronic device 301, which includes a near-end transmitter (NETX) 306 and a receiver 312. In one or more embodiments, the second electronic device 300 and the first electronic device 301 may be configured to operate in a full duplex mode. Therefore, the first and second electronic devices 301, 300 may transmit data and also receive data concurrently over the same channel (i.e., bidirectional signal transmission). As a consequence of the fully duplex operation, crosstalk or echo may be introduced and impact the received signal (e.g., quality of the signal). In other words, as the FETX 302 transmits a signal to the receiver 312 of the first electronic device, the NETX 306 may also be trying to transmit a signal to the second electronic device 300 over the same interface 304. Therefore, the two transmitted signals may interfere with each other and the received signal may include undesired crosstalk or echo in the signal. Therefore, in order for the first electronic device 301 to operate in full duplex mode, it is desirable to include a self-induced crosstalk or echo remover. One technique for such echo cancellation may be to use a hybrid to improve the margin of the received signal power over the overall noise power.

Figure 4:
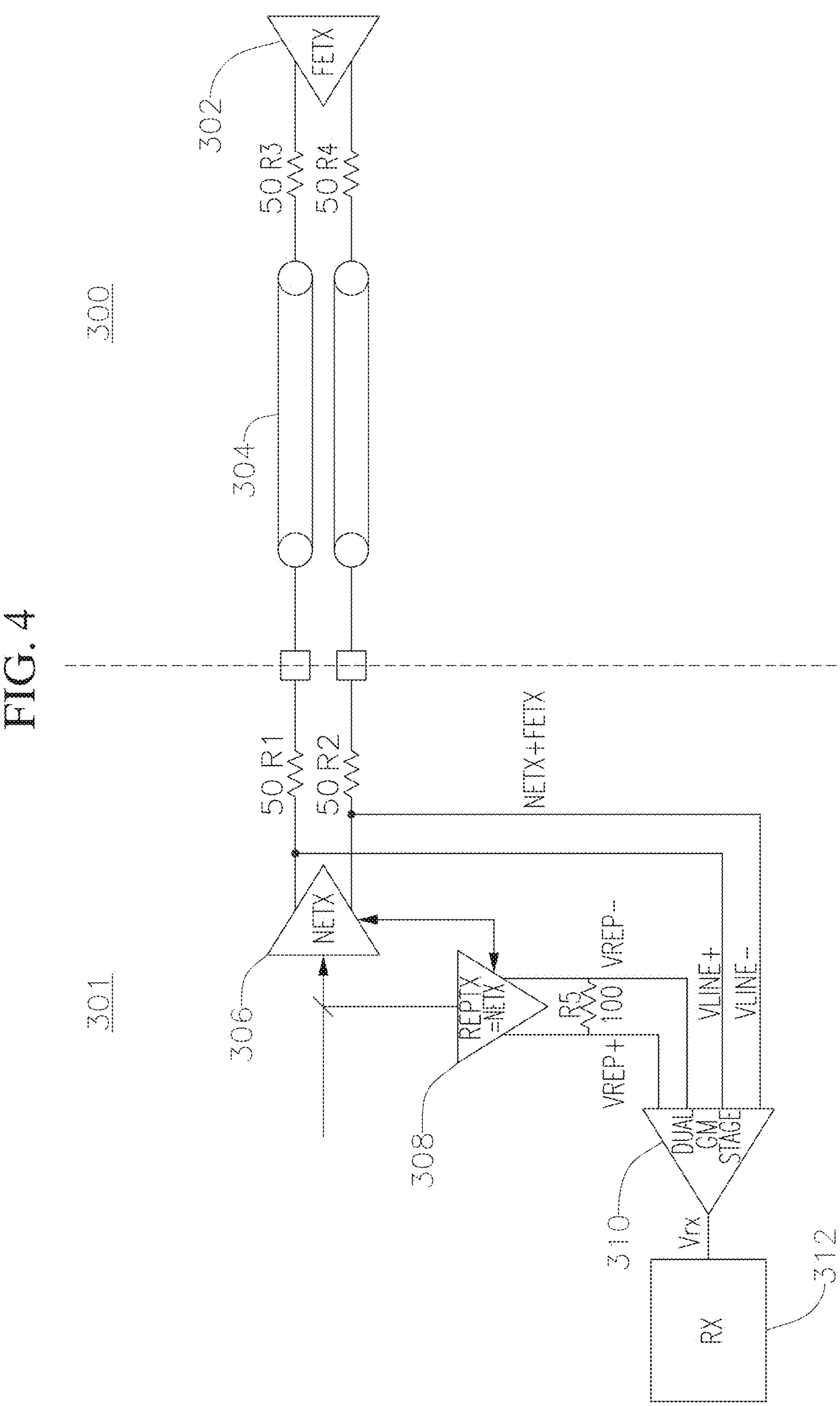
FIG. 4 is a schematic view of a first electronic device coupled with a second electronic device over an interface, according to one or more embodiments of the present disclosure.

FIG. 4 is a schematic view of the second electronic device 300 coupled with the first electronic device 301 over the interface 304, according to one or more embodiments of the present disclosure. The second electronic device 301 may include at least a FETX 302 having a differential output. Each output of the differential output may be coupled to a resistor R3 and R4, which are then coupled to the interface 304. Here, the interface 304 may be a high-speed differential serial interface 304. The first electronic device may include at least a NETX 306 having a differential output. Each output of the differential output may be coupled to a resistor R1 and R2, which are then coupled to the interface 304. Therefore, the output from the FETX 302 is coupled to a first end of the interface 304 and the output from the NETX 301 is coupled to a second end of the interface 304 to facilitate a full duplex operation.

In one or more embodiments, the output from the FETX 302 and the output from the NETX 306 may be coupled to an echo canceller 310. That is, because the signal from the FETX 302 received by the first electronic device 301 and the signal from the NETX 306 are combined, thereby resulting in crosstalk, the echo canceller 310 may be configured to remove the undesired signal generated by the NETX 306 from the signal from the FETX 302 received at the first electronic device 301 (which is a signal that now includes both NETX signal and the FETX signal). In order to remove the crosstalk (or echo) from the combined FETX and NETX signal, a replica transmitter 308 (e.g., a signal replicator) may be configured to replicate the NETX signal. The output from the replica transmitter 308 may be a differential output and it may be provided as an input to the echo canceller 310. The echo canceller 310 may then subtract the replica signal from the combined FETX and NETX signal, and because the replica signal is identical (or substantially similar) to the NETX signal, the echo canceller 310 may output the difference, which is just the FETX signal, to the receiver 312.

Figure 5:
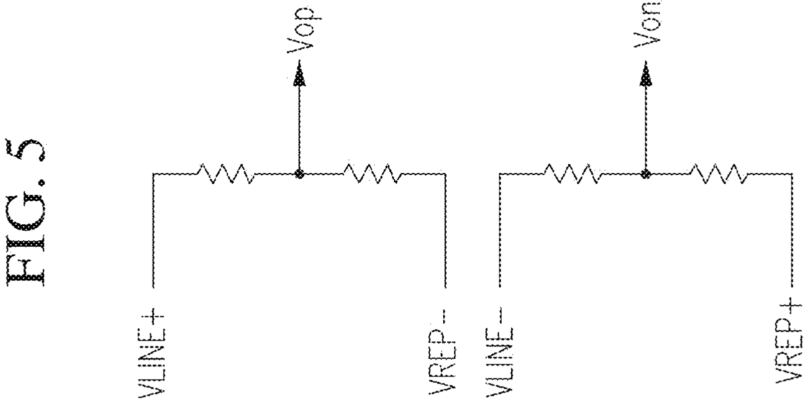
FIG. 5 is a schematic view of an example passive resistive adder circuit.

In some embodiments, an echo canceller may be made of a simple passive resistive adder circuit such as the circuit shown in FIG. 5. Thus, for example, VLINE+ may correspond to the received FETX+ and NETX+ signals, and the VREP− may correspond to the negative replica signal, and VLINE− may correspond to the received FETX− and NETX− signals and the VREP+ may correspond to the positive replica signal. Therefore, by adding the positive VLINE+ voltage and the negative VREP− to effectively remove the NETX+ signal, FETX+ signal may be generated at output Vop. Similarly, by adding the negative VLINE− voltage and the positive VREP+ to effectively remove the NETX− signal, FETX− signal may be generated at output node Von. However, a passive circuit may result in attenuation of the signal (e.g., about 6 dB attenuation). Thus, an active circuit may be utilized to overcome these shortcomings.

Figure 6:
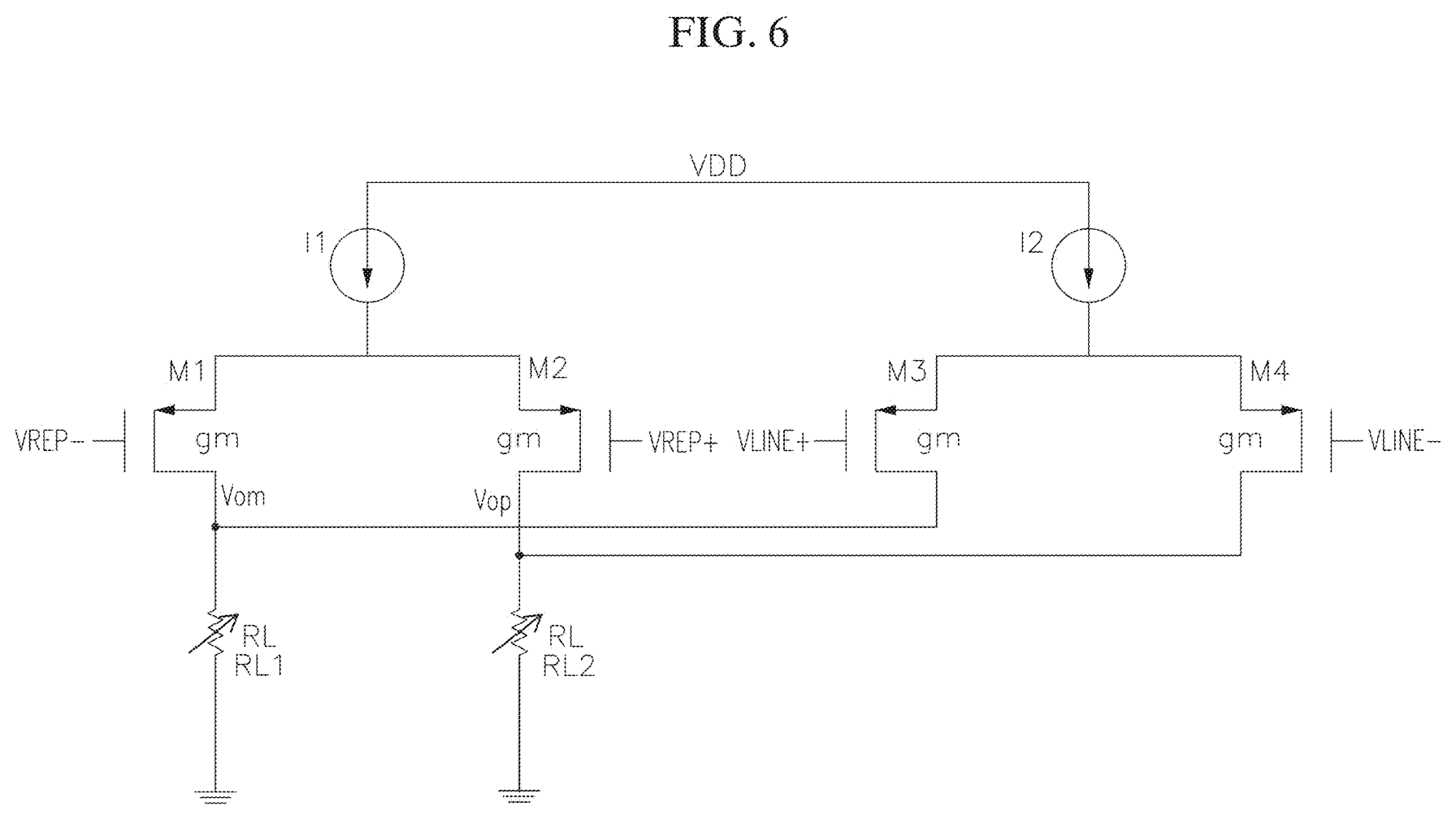

FIG. 6 is a schematic diagram of an active echo canceller circuit, according to one or more embodiments of the present disclosure. The echo canceller circuit may correspond to the echo canceller 310 shown and described in FIG. 4, and may be configured to cancel or substantially remove the echo or crosstalk from the total received signal (e.g., combined FETX signal and NETX signal) by the first electronic device 301. The active echo canceller circuit 310 may include transistors M1, M2, M3, M4 that are configured such that the replica signal is subtracted from the combined received signal (sum of the FETX and NETX signals) at output nodes Vom and Vop across variable resistors RL1 and RL2. Accordingly, a current mode logic (CML) circuit may be formed by transistors M1 and M2, that may be connected between a current source 11 and variable resistors RL1 and RL2. Similarly, another CML circuit may be formed by transistors M3 and M4 may be connected between a current source 12 and variable resistors RL1 and RL2.

In operation, positive combined received signal VLINE+ is applied to the gate of transistor M3 and the negative replica signal VREP− is applied to the gate of transistor M1 in order to subtract the replica signal (which is equivalent to the NETX signal) from the positive combined received signal VLINE+ at node Vom, thereby effectively removing the undesired crosstalk or echo from the received signal, which is provided at output Vom. Similarly, negative combined received signal VLINE− is applied to the gate of transistor M4 and the positive replica signal VREP+ is applied to the gate of transistor M2 in order to subtract the replica signal (which is equivalent to the NETX signal) from the negative received signal VLINE− at node Vop, thereby removing the undesired crosstalk or echo from the received signal, which is provided at output node Vop. Accordingly, the differential output nodes Vom and Vop from the echo canceller 310 now includes only the FETX signal with crosstalk removed or substantially removed. Because of the active elements including the transistors M1, M2, M3, M4 and current sources 11 and 12, the received signal is less likely or does not become attenuated as is in the case with a passive echo canceller such as the one shown in FIG. 5. Furthermore, various properties of variable resistors RL1 and RL2 may be programmed to adjust the gain and common mode across variations in process, voltage, and temperature. Furthermore, external lossy hybrid may be avoided by implementing the echo canceller in the first electronic device 301 (e.g., on the same chip as the NETX 306 and receiver 312 circuits), thereby reducing the overcall area, and therefore cost.

Figure 7:
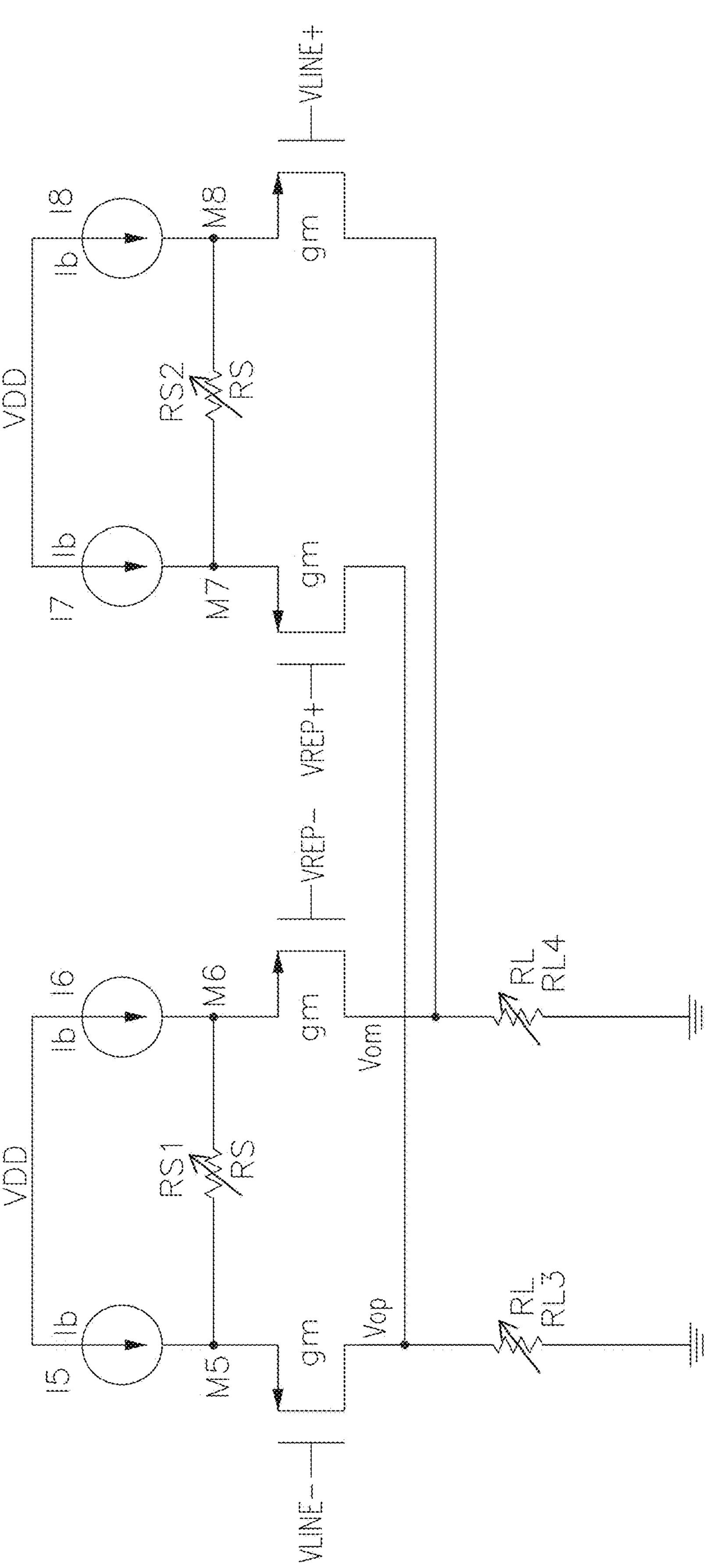
FIG. 7 is a schematic view of another active echo canceller circuit, according to one or more embodiments of the present disclosure.

FIG. 7 is a schematic diagram of another active echo canceller circuit, according to one or more embodiments of the present disclosure. The echo canceller circuit 710 may correspond to the echo canceller 310 shown and described in FIG. 4, and may be configured to cancel or substantially remove the echo or crosstalk from the total received signal by the first electronic device 301. The echo canceller 710 may differ from the echo canceller 310 illustrated in FIG. 6 in that the inputs to the CML circuits are rearranged compared to the inputs to the CML circuits in FIG. 6. That is, the received signal and the replica signal to the transistors M5, M6, M7, M8 are inputted to different transistors, and each of the transistors M5, M6, M7, M8 are connected to a different current source 15, 16, 17, 18, and a tunable source regenerative resistor RS1 is coupled between transistors M5 and M6 and a tunable source regenerative resistor RS2 is coupled between transistors M7 and M8.

In more detail, the active echo canceller circuit 710 may include transistors M5, M6, M7, M8 that are configured such that the replica signal is subtracted from the total received signal (sum of the FETX and NETX signals) at output nodes Vom and Vop across variable resistors RL3 and RL4. Accordingly, a CML circuit may be formed by transistors M5 and M6, and another CML circuit may be formed by transistors M7 and M8. Transistor M5 may be connected between a current source 15 and variable resistor RL3, transistor M6 may be connected between a current source 16 and variable resistor RL4, transistor M7 may be connected between a current source 17 and variable resistor RL3, and transistor M8 may be connected between a current source 18 and variable resistor RL4. In some embodiments, the transistors M5, M6, M7, M8 may be MOSFETs or other active elements that are known to those having ordinary skill in the art. In operation, the negative combined received signal VLINE− is applied to the gate of transistor M5, the negative replica signal VREP− is applied to the gate of transistor M6, the positive replica signal VREP+ is applied to the gate of transistor M7, and the positive combined received signal VLINE+ is applied to the gate of transistor M8. Accordingly, transistor M5 and transistor M7 may be implemented as active subtractors to remove the NETX signal from the negative received signal VLINE−, and transistor M6 and M8 may be implemented as active subtractors to remove the NETX signal from the positive received signal VLINE+. Therefore, the active echo canceller circuit 710 may effectively remove the crosstalk from the received signal to provide a substantially noise-free FETX signal at outputs node Vop and Vom.

In one or more embodiments, a variable resistor RS1 may be coupled between the source of transistor M5 and the source of transistor M6, and a variable resistor RS2 may be coupled between the source of transistor M7 and the source of transistor M8. Variable load resistor RL3 may be coupled between the drain of transistor M5 and ground, variable load resistor RL4 may be coupled between the drain of transistor M6 and ground, variable load resistor RL3 may be coupled between the drain of transistor M7 and ground, and variable load resistor RL4 may be coupled between the drain of transistor M8 and ground. Therefore, the gain at the outputs nodes Vop and Vom may be adjustable by varying one or more of the variable resistors RS1, RS2, or variable load resistors RL3, RL4. Accordingly, the quality of the received signal in a full duplex electronic device may be improved by utilizing an active echo canceller. By rearranging the input signals to the gate of the transistors M5, M6, M7, M8, each differential pair may be subject to equal and relaxed swing, thereby improving linearity.

Figure 8:
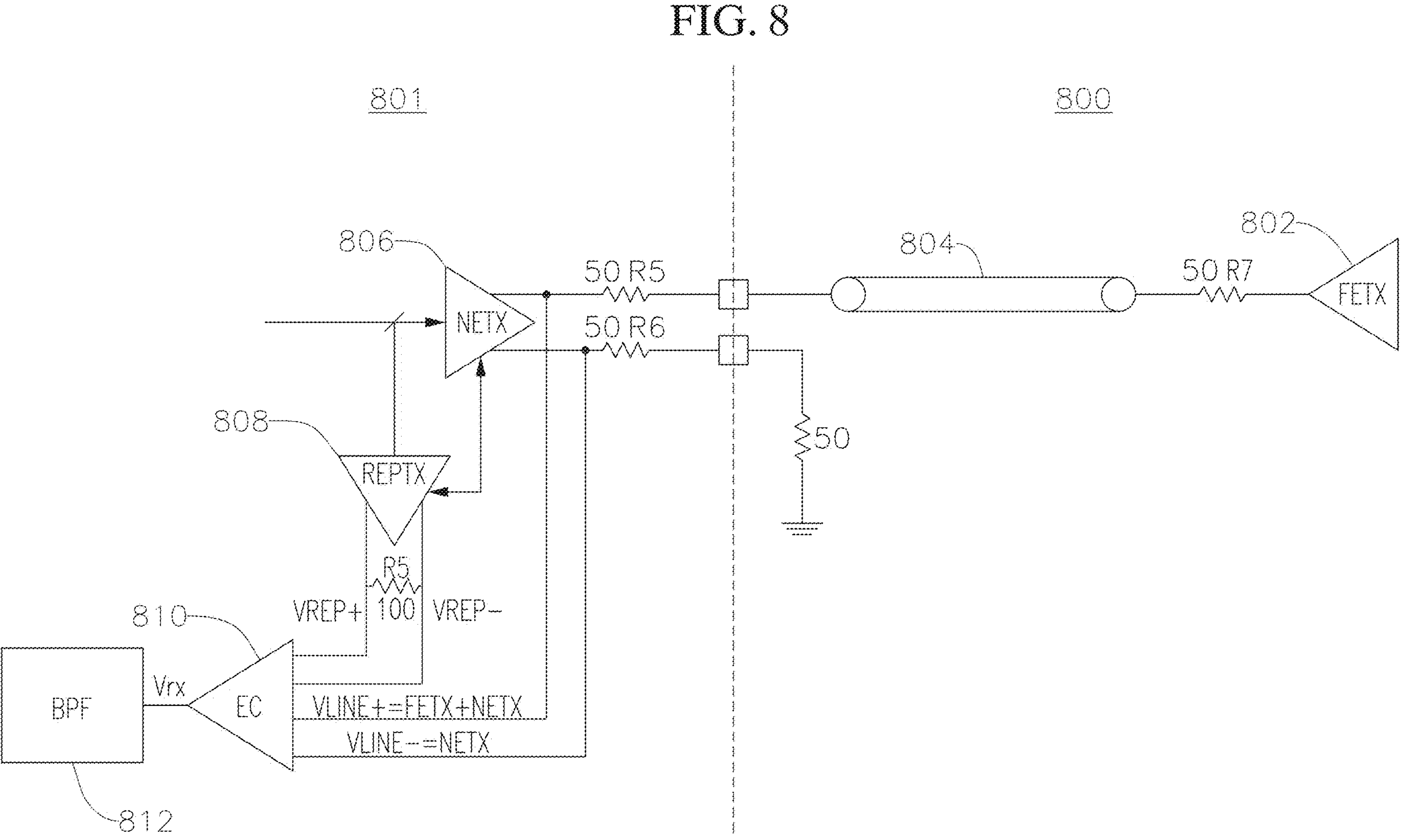
FIG. 8 is a schematic view of a first electronic device coupled with a second electronic device over an interface, according to one or more embodiments of the present disclosure.

FIG. 8 is a schematic view of a second electronic device 800 coupled with a first electronic device 801 over an interface 804, according to one or more embodiments of the present disclosure. Differently from FIG. 4, the second electronic device 800 of FIG. 8 has a single-ended output from the FETX 802, and the first electronic device 801 has a differential input/output from the NETX 806. Thus, the interface 804 coupling the second electronic device 800 with the first electronic device 801 is configured to convert the single-ended output to the differential input/output by grounding or floating one of the two differential input/outputs and connecting the other one of the two differential input/output to the singe-ended output. Accordingly, the interface 804 converts the single-ended output of the second electronic device 800 to the differential input/output of the first electronic device 801 so that the signal from the FETX 802 may be received by the echo canceller 810 of the first electronic device 810. The echo canceller 810, the replica transmitter 808, and the receiver 812 are substantially similar to those described with reference to FIG. 4 and therefore will not be repeated here with reference to FIG. 8. Furthermore, the echo canceller 810 may be implemented by an echo cancellation circuit such as those shown in FIG. 6 or 7. Therefore, even though the inputs to the echo canceller 810 may be unbalanced because one of the two differential inputs to the echo canceller 810 includes both the FETX signal and the NETX signal (i.e., received signal and the crosstalk) and the other one of the two differential inputs includes only the NETX, the echo canceller 810 described according to one or more embodiments of the present disclosure is able to convert the unbalanced inputs to fully balanced differential outputs from the receiver 812 because of its high common mode rejection and linearity.

Accordingly, a signal from a FETX may be transmitted to a receiver over a bidirectional differential or single-ended interface (e.g., high-speed serial interface) for a fully duplex operation, while removing crosstalk or echo and balancing unbalanced inputs.

Figure 9:
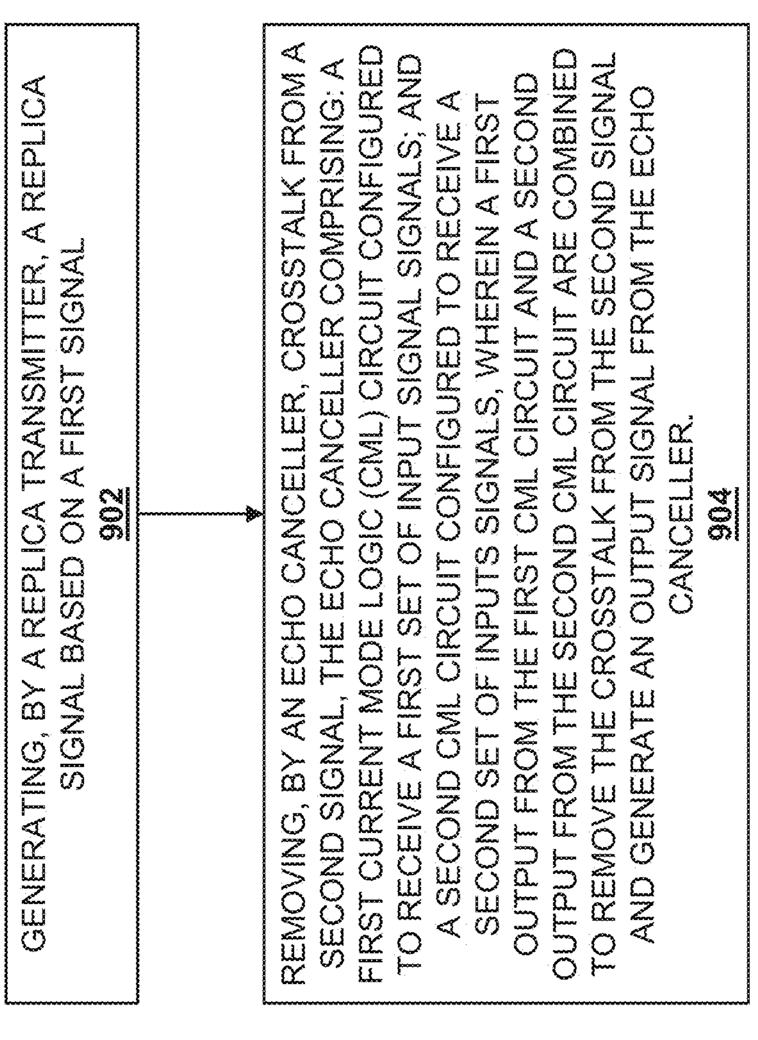
FIG. 9 is a flow chart of a method for removing crosstalk or echo in a bidirectional electronic device or system, according to one or more embodiments of the present disclosure.

FIG. 9 is a flow chart of a method for canceling echo or interference from a bi-directional electronic device or system, according to one or more embodiments of the present disclosure. The method may include generating a replica signal by a replica transmitter based on a first signal (902). In some embodiments, the first signal may be a NETX signal generated by a NETX of a first electronic device such as a camera or other sensors. Next, crosstalk may be removed from a second signal by an echo canceller (904). In some embodiments, the second signal may include both the NETX signal and a FETX signal. The FETX signal may be generated by a second electronic device such as an ECU. The echo canceller may include a first current mode logic (CML) circuit configured to receive a first set of input signal signals, and a second CML circuit configured to receive a second set of inputs signals. A first output from the first CML circuit and a second output from the second CML circuit may then be combined to remove the crosstalk from the second signal at an output and generate an output signal from the echo canceller. Accordingly, the output signal may include just the FETX signal after the crosstalk is removed from the second signal.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims and their equivalents.

What is claimed is:

1. A system comprising: a signal replica transmitter configured to generate a replica signal based on a first signal; and an echo canceller configured to remove crosstalk from a second signal, the echo canceller comprising: a first current mode logic (CML) circuit configured to receive a first set of input signals; and a second CML circuit configured to receive a second set of input signals, wherein a first output from the first CML circuit and a second output from the second CML circuit are combined to remove the crosstalk from the second signal and generate an output signal from the echo canceller;

wherein the first signal is generated by a near-end transmitter (NETX) of a first electronic device, and the second signal comprises a third signal generated by a far-end transmitter (FETX) of a second electronic device and the crosstalk from the first electronic device;

wherein the first set of input signals comprises the replica signal, the first CML circuit comprises a first transistor and a second transistor, the replica signal is applied to a gate of the first transistor, and the replica signal is applied to a gate of the second transistor.

2. The system of claim 1, wherein the third signal is transmitted by the second electronic device by a single-ended interface, and the third signal is received by the first electronic device by a differential interface.

3. The system of claim 1, wherein the second set of input signals comprises the second signal, the second CML circuit comprises a third transistor and a fourth transistor, the second signal is applied to a gate of the third transistor, and the second signal is applied to a gate of the fourth transistor.

4. The system of claim 3, wherein the first transistor and the third transistor are coupled to a first variable load resistor, and the second transistor and the fourth transistor are coupled to a second variable load resistor.

5. The system of claim 4, wherein the first transistor and the second transistor are coupled to a first current source, and the third transistor and the fourth transistor are coupled to a second current source.

6. The system of claim 1, wherein the first set of input signals comprises the replica signal and the second signal, the first CML circuit comprises a first transistor and a second transistor, the second signal is applied to a gate of the first transistor, and the replica signal is applied to a gate of the second transistor.

7. The system of claim 6, wherein the second set of input signals comprises the replica signal and the second signal, the second CML circuit comprises a third transistors and a fourth transistors, the replica signal is applied to a gate of the third transistors, and the second signal is applied to a gate of the fourth transistor.

8. The system of claim 7, wherein the first transistor and the third transistor are coupled to a first variable load resistor, and wherein the second transistor and the fourth transistor are coupled to a second variable load resistor.

9. The system of claim 8, wherein the first transistor is coupled to a first current source, the second transistor is coupled to a second current source, the third transistor is coupled to a third current, and the fourth transistor is coupled to a fourth current source.

10. A method, comprising: generating, by a replica transmitter, a replica signal based on a first signal; and removing, by an echo canceller, crosstalk from a second signal, the echo canceller comprising: a first current mode logic (CML) circuit configured to receive a first set of input signal signals; and a second CML circuit configured to receive a second set of inputs signals, wherein a first output from the first CML circuit and a second output from the second CML circuit are combined to remove the crosstalk from the second signal and generate an output signal from the echo canceller;

wherein the first signal is generated by a near-end transmitter (NETX), and the second signal comprises a third signal generated by a far-end transmitter (FETX) and the crosstalk;

wherein the first set of input signals comprises the replica signal, the first CML circuit comprises a first transistor and a second transistor, the replica signal is applied to a gate of the first transistor, and the replica signal is applied to a gate of the second transistor.

11. The method of claim 10, wherein the second set of input signals comprises the second signal, the second CML circuit comprises a third transistor and a fourth transistor, the second signal is applied to a gate of the third transistor, and the second signal is applied to a gate of the fourth transistor.

12. The method of claim 11, wherein the first transistor and the third transistor are coupled to a first variable load resistor.

13. The method of claim 12, wherein the second transistor and the fourth transistor are coupled to a second variable load resistor.

14. The method of claim 13, wherein the first transistor and the second transistor are coupled to a first current source, and the third transistor and the fourth transistor are coupled to a second current source.

15. The method of claim 10, wherein the first set of input signals comprises the replica signal and the second signal, the first CML circuit comprises a first transistor and a second transistor, the second signal is applied to a gate of the first transistor, and the replica signal is applied to a gate of the second transistor.

16. The method of claim 10, wherein the second set of input signals comprises the replica signal and the second signal, the second CML circuit comprises a third transistors and a fourth transistors, the replica signal is applied to a gate of the third transistors, and the second signal is applied to a gate of the fourth transistor.

* * * * *